United States Patent [19]

Haviv

[11] Patent Number: 5,080,139
[45] Date of Patent: Jan. 14, 1992

[54] VALVE ASSEMBLY WITH DISK-LIKE VALVE BODY

[75] Inventor: Shlomo Haviv, Bronx, N.Y.

[73] Assignee: Reseal International Limited Partnership, New York, N.Y.

[21] Appl. No.: 607,234

[22] Filed: Oct. 31, 1990

[51] Int. Cl.⁵ .............................................. F16K 15/14
[52] U.S. Cl. ...................................... 137/860; 222/494
[58] Field of Search ................. 222/494; 137/853, 860

[56] References Cited

U.S. PATENT DOCUMENTS

| 2,107,596 | 2/1938 | Bourdon | 137/853 |
| 3,092,144 | 6/1963 | Green | 137/853 X |
| 4,846,810 | 7/1989 | Gerber | 137/853 X |

Primary Examiner—Robert G. Nilson
Attorney, Agent, or Firm—Toren, McGeady & Associates

[57] ABSTRACT

A fluid dispensing valve is made up of a valve body laterally enclosed by an elastomeric sheath. The valve body is connected to a container from which fluid is dispensed through the valve body. The valve body has an inlet passage for flowing the fluid from the container to a space between the elastomeric sheath and an outer surface of the valve body. An outlet passage through the valve body, spaced angularly from the inlet passage, has an opening through the outer surface of the valve body covered by the elastomeric sheath, so that fluid pressed out of the container can flow between the elastomeric sheath and the outer surface to the outlet passage and then be dispensed from the valve. The valve body can be a flat disk-like member.

6 Claims, 1 Drawing Sheet

VALVE ASSEMBLY WITH DISK-LIKE VALVE BODY

BACKGROUND OF THE INVENTION

The present invention is directed to a valve assembly with a disk-like valve body for discharging a fluid from a container, such as a flexible collapsible container, while preventing back flow into the container, particularly of contaminants. The valve assembly is formed of a valve body with an inlet at one end and a passageway extending through the valve body from the inlet. The valve body has an outlet spaced from the inlet with a passageway within the valve body connected to the outlet. An elastomeric sheath tightly encloses the outer surface of the valve body. The elastomeric sheath can expand outwardly permitting flow from the inlet passageway into the space between the inside surface of the sheath and the outside surface valve body. The fluid in the space between the sheath and the valve body then flows through the outlet passageway to the outlet. The elastomeric sheath prevents any back flow from the outlet passageway to the inlet passageway after the fluid is dispensed.

In dispensing sterile fluids from a container, especially when the container has an extended use lifetime, it is important to prevent any back flow of contaminants into the container during and following the dispensing operation. Contamination from the ambient atmosphere may include micro-organisms, atmospheric gases, moisture, dust and the like. If a sterile fluid is contaminated it can affect its quality, potency and even the safety of the fluid.

If a container of sterile fluid has a one-time use and is not intended to be dispensed over an extended period of time, the problem of contaminants entering the containers usually does not exist.

Sterile fluid may involve a variety of products, such as drugs, beverages, cosmetics and the like. The fluid may be a liquid, lotion, cream, gel, powder, gas or the like.

The present invention is an improvement on the valve assembly disclosed in U.S. Pat. No. 4,846,810 hereinafter referred to as the ReSeal Valve. In the ReSeal Valve an axially elongated valve body was used enclosed within an elastomeric sheath. While the ReSeal Valve is effective in maintaining the sterility of a fluid within a container, the formation of the flow passages through the valve body can increase its cost. Further, the axial elongation of the valve may interfere with its utility.

SUMMARY OF THE INVENTION

The primary object of the present invention is to provide an improvement of the ReSeal Valve and particularly to effect a limitation in the size of the valve body, and to vary the location and orientation of the valve outlet.

In the present invention, the valve body has a disk-like shape. The disk-like shape provides a valve body with a comparatively large diameter as compared to its axial length. The valve body is positioned at the outlet of a flexible container so that one surface forms a closure facing into the container and an opposite surface faces out of the container and locates the valve outlet. The valve body has a relatively short circumferentially extending outer surface extending in the direction from the inlet side to the outlet side.

An elastomeric sheath is tightly fitted around the circumferentially extending outer surface so that it is in tightly fitting engagement with such surface. An inlet passage extends from the inlet facing into the container to the circumferential surface. Spaced angularly from the inlet passage is an outlet passage extending from the circumferentially extending outer surface to the valve outlet. The elastomeric sheath covers the outlet from the inlet passage and the inlet to the outlet passage. Further, the elastomeric sheath is secured about the circumferentially extending outer surface so that it is not possible for the ambient atmosphere to enter between the sheath and the valve body and flow into the container. Similarly, the fluid in the container can only exit through the inlet passage, it can not bypass the valve body and flow between the inside of the elastomeric sheath and the circumferentially extending outside surface of the valve body.

As compared to the ReSeal Valve, the axially shortened disk-like valve body reduces the length of the inlet and outlet passage in the body.

A variety of containers can be used with the valve of the present invention. A bellows-like container can be utilized which collapses as the fluid is dispensed. Due to its bellows-like construction the fluid can be easily pressed or forced out of the container through the valve of the present invention.

In another embodiment, the container can be a flexible bag enclosed within a rigid or semi-rigid support. Further, a piston member can be used in combination with the bag and support for pressing the fluid out of the container and collapsing the container.

As mentioned above, it is a significant feature of the invention that the elastomeric sheath is sealed to the valve body on the opposite sides of the inlet and outlet openings in the circumferentially extending outer surface of the valve body for preventing any bypass flow of the fluid out the container or of contaminants into the container.

It is important when the elastomeric sheath is enclosed within a sleeve or support that a vent is provided opening to the outside surface of the elastomeric sheath so that the sheath will return to tightly fitting engagement with the valve body.

It is possible to include additional means with the valve body to afford metered dosage out of the container. This is particularly true, where the fluid being dispensed is a pharmaceutical.

Materials used in the valve assembly can be selected based on the fluid to be dispensed and the sterilization methods used on the fluid. If thermosterilization is used, the materials selected must maintain their integrity throughout the full temperature range of sterilization and for the time period required. Sterilization can be carried out in other ways, such as by radiation, ethylene oxide and the like.

An important feature of the valve assembly of the present invention, which prevents contaminants for entering the container, is that it is unnecessary to add preservatives to the fluid. The use of preservatives may be costly, affect the potency of the fluid, and cause harmful side effects, especially in the case of pharmaceuticals.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
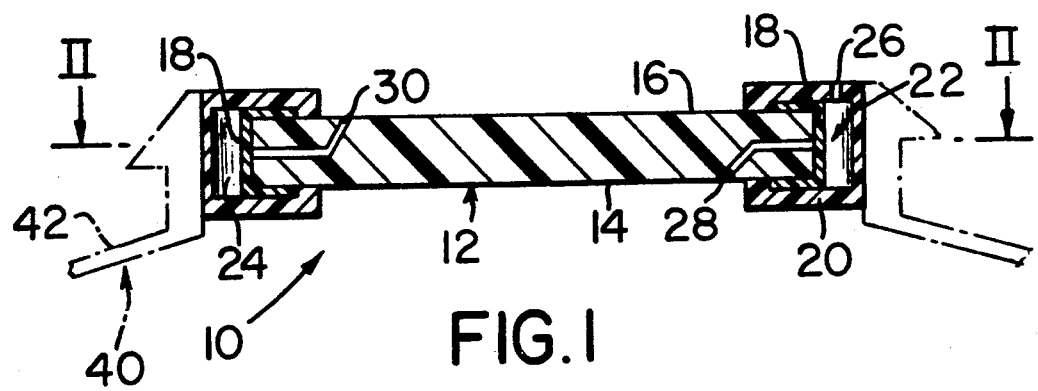
FIG. 1 is an axially extending sectional view of a disk-like valve body embodying the present invention.
Figure 2:
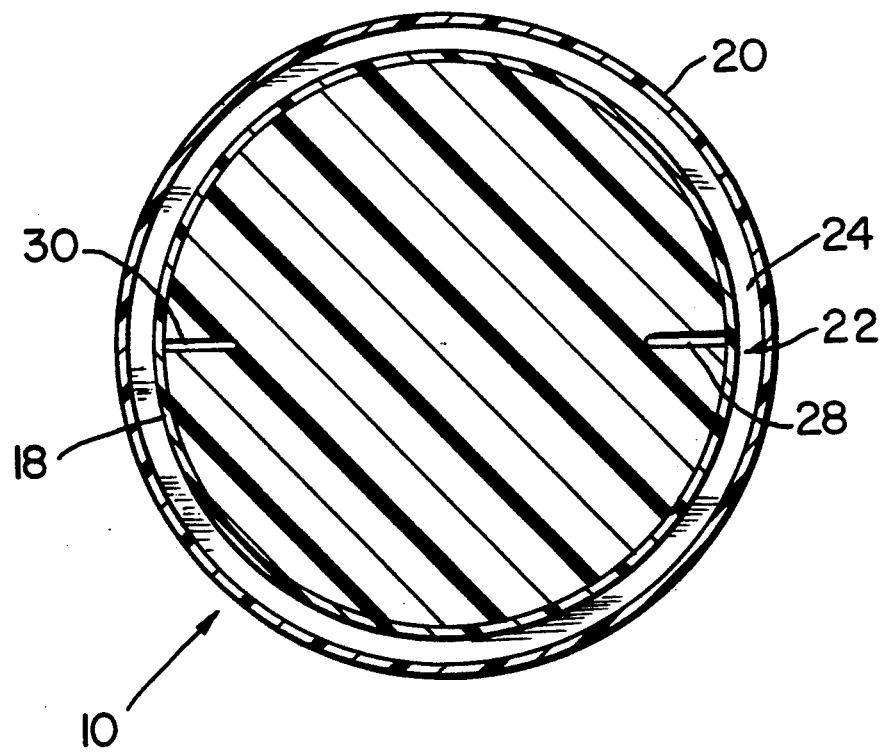
FIG. 2 is a sectional view taken along the line II—II in FIG. 1

In FIG. 1 a valve assembly 10 is shown in axially extending section including a circular disk-like valve body 12 having an inlet surface 14 and an outlet surface 16 each extending transversely of the valve body axis. The valve body has a circular circumferentially extending outer surface 18 extending axially between the inlet and outlet surfaces 14, 16. An elastomeric sheath 20 encloses the outer surface 18 and extends radially inwardly from the outer surface for a short distance along each of the inlet an outlet surfaces 14, 16. Enclosing the elastomeric sheath 20 and holding it in sealed engagement with the inlet and outlet surfaces 14, 16 is a annular enclosure member 22. An annular shaped open space 24 is located within the enclosure member 22 encircling the outer surface of the elastomeric sheath 18. A vent 26 extends through the enclosure member opening into the space 24.

The disk 12 has an inlet passage 28 extending from the inlet surface 14 into the disk and terminating at the outer surface 18 and being open to the inside surface of the elastomeric sheath 20. Spaced 180° around the outer surface 18 from the inlet passage 28 is an outlet passage 30 extending from the outer surface 18 to the outlet surface 16 of the disk-like valve body 12.

Shown in phantom in FIG. 1 is an outlet end 42 of a flexible container 40.

In use, the flexible container is completely filled with fluid to be dispensed so that it contains no air. The elastomeric sheath 20 forms a seal for the inlet passage 28 so that fluid can not leak out of the container.

When a pressing force is applied to the container 40 the fluid is forced into the inlet passage 28 and causes the elastomeric sheath 20 to expand so that the fluid enters a space between the inside surface of the elastomeric sheath and the outer surface 18 of the valve body 12. In the space between the valve body and the sheath, the fluid flows in the circumferential direction from the outlet end of the inlet passage 28 to the inlet end of the outlet passage 30. When it reaches the outlet passage 30 the fluid flows outwardly and is dispensed. When the pressing or compressing of the container 40 is released the flow of fluid out of the container stops. When the fluid is discharged out of the valve body the elastomeric sheath 20 reseats itself against the outer surface of the valve body. As a result, the outlet passage 30 is sealed at its inlet end and contaminants from the ambient atmosphere can not flow back through the valve body into the container.

The enclosure member 22 has vent opening 26 into the space in the enclosure member encircling the elastomeric sheath 20. Accordingly, atmospheric pressure is present around the outside of the elastomeric sheath within the space 24 so that when the fluid is dispensed it is assured that the sheath returns into tightly fitting sealed contact with the outer surface 18 of the disk-like valve body 12.

The disk-like valve body can be formed of any imperforate material such as rubber, plastics or metal so that the fluid within the container can not seep through the valve body. Similarly, the enclosure member 22 can be formed of a variety of materials as long as it is substantially rigid and assures the sealed engagement of the sheath with the surface of the valve body. The elastomeric sheath can be formed of rubber, artificial or natural, or a plastics material. The significant feature is that the sheath can expand outwardly permitting the fluid to be dispensed and will reseat itself against the outer surface of the valve body when the fluid is dispensed preventing any back flow through the valve body into the container 40.

While a single inlet passage 28, and a single outlet passage 30, is shown plural inlet and outlet passages could be provided as long as they are arranged to provide effective flow out of the container through the valve body.

While specific embodiments of the invention have been shown and described in detail to illustrate the application of the inventive principles, it will be understood that the invention may be embodied otherwise without departing from such principles.

I claim:

1. Fluid dispensing valve comprising a valve body having a central axis, said valve having a first end surface and an opposite second end surface each extending transversely of said central axis, and a circumferentially extending side surface encircling said central axis and located between said first and second end surfaces, an elastomeric sheath tightly enclosing and contacting said side surface and being expandable outwardly therefrom, said sheath having an inside surface contacting said side surface, at least one first passage extending through said valve body for receiving fluid at a first end and discharging fluid at a second end thereof through said side surface, at least one second passage through said valve body for receiving fluid at a first end at said side surface and for dispensing the fluid out of said valve body at a second end thereof, each of said first and second passages extend through said side surface and are covered by said inside surface of said sheath, said first and second passages at said inside surface being spaced angularly apart relative to the central axis, means sealing said sheath to said valve body on opposite sides in the axial direction of the second end of said first passage and the first end of said second passage in said side surface, and said valve body having a maximum diameter greater than the axial length thereof.

2. A fluid dispensing valve, as set forth in claim 1, wherein said valve body is a flat disk-like member with said first passage having an inlet at the first end thereof located in said first end surface and said second passage having an outlet at the second end thereof located in said second end surface.

3. A fluid dispensing valve, as set forth in claim 2, wherein said means sealing said sheath comprises an enclosure member enclosing and sealing said elastomeric sheath against said valve body.

4. A fluid dispensing valve, as set forth in claim 3, wherein said enclosure member in combination with an outside surface of said sheath forms an annular open space within said enclosure member encircling said sheath so that said sheath can expand outwardly into said space.

5. A fluid dispensing valve, as set forth in claim 4, wherein said enclosure member has a vent therethrough opening to said space.

6. A fluid dispensing valve, as set forth in claim 2, wherein elastomeric sheath is C-shaped in axial section with said C-shaped sheath having one leg contacting said first end surface and another leg contacting said second end surface and with a bight section extending between said legs and contacting said side surface of said valve body.

* * * * *